United States Patent Office 2,933,407
Patented Apr. 19, 1960

2,933,407

DEXTRIN-DEXTRAN ADHESIVES

Everette E. Witt and Frederick W. Holt, Jr., Dayton, Ohio, assignors to The Commonwealth Engineering Company of Ohio, Dayton, Ohio No Drawing. Application August 8, 1956
Serial No. 602,930

5 Claims. (Cl. 106—162)

This invention relates to new adhesive compositions. More particularly, the invention relates to new dextrin-based compositions having adhesive properties.

Dextrin, obtained by the degradation of starch, has been used as an adhesive. However, the known compositions based on dextrin are not entirely satisfactory adhesives from the viewpoint of water-resistance, tack, "grab," consistency and the range of viscosities obtainable by mixing the dextrin with water or aqueous media.

The object of this invention is to provide new adhesive compositions the major adhesive constituent of which is dextrin but which have improved characteristics as compared to dextrin and the known compositions comprising dextrin as the primary adhesive component.

This and other objects are accomplished by the present invention which provides new, improved adhesives comprising dextrin, and as modifier, a selected dextran or mixture of selected dextrans, with or without the inclusion of plasticizers.

The dextrans comprise a group of polysaccharides which can be obtained by the action on sucrose of selected bacteria such as those of the *Leuconostoc mesenteroides* or *L. dextranicum* types or of the enzyme dextransucrase produced by the bacteria and isolated from the culture thereof.

At present, ninety-six dextrans have been investigated by the Starch and Dextrose Section, Northern Utilization Research Branch, Peoria, Ill., and designated by a numeral identifying the strain of bacteria cultivated to produce the enzyme, preceded by the letters NRRL B—. The constant feature of these dextrans is their structural component which appears to be almost exclusively the anhydroglucopyranosidic unit of alpha-configuration. The 1,6-glucosidic linkages constitute from 50% to 97% of the total linkages.

It is found, in accordance with this invention, that specific dextrans having special characteristics have the capacity, when incorporated in adhesive compositions the primary binder of which is dextrin, to enhance the properties, and hence the usefulness, of the compositions. The special dextrans which have this capacity are characterized by maximum molecular linearity as indicated by a high alpha-1,6 to non-1,6 repeating glucosidic ratio. Specifically, in these selected dextrans 86% to 97% of the glucosidic linkages are 1,6 linkages. The selected dextrans are further characterized in that they form stable aqueous solutions of at least 10% concentration, either by merely mixing with water, or by such expedients as the application of heat to facilitate the dissolution or by gradually working water into the particulate dextran so that each particle becomes dispersed in its own dense paste and then adding water to the desired fluidity. An additional characteristic of the selected dextrans, and a requirement for the present purposes, is that aqueous 10% solutions thereof have, at room temperature, viscosities in the range 30 to 200,000 centipoises determined with the Brookfield viscometer. Mixtures of two or more specifically different dextrans which mixtures, in 10% aqueous solution, have viscosities in the stated range, may be used.

Typical dextrans which meet the present requirements include those produced by the micro-organisms bearing the following NRRL type designations: B–1146, –512, –1397, –641, –1064, –1066, –1382, –1383, –1308 and –1255.

The molecular weight of the dextran obtained by inoculating a sucrose-containing nutrient medium with a whole culture of the selected bacterium, or with the enzyme separated from the culture, depends, to an extent, on the percent sucrose in the nutrient. Thus, at 10% sucrose levels the molecular weight of the dextran formed and precipitated from the fermentate is extremely high, estimated in the millions. At higher sucrose concentrations such as 20% the molecular weight of the dextran while still high as compared to that of other organic materials, is usually, though not always, lower than the molecular weight of dextran produced in the media made up with the smaller sucrose concentrations. The native dextrans produced under conditions of varying sucrose levels, and otherwise meeting the aforesaid specifications, may be used in the practice of this invention.

In some cases, also, the dextran is structurally heterogeneous and can be separated into dextrans belonging in different classes ranging from readily or ultimately water-soluble dextrans meeting the present viscosity requirements to water-insoluble dextrans the insolubility of which increases progressively with increase in the content of non-1,6 linkages. Such dextrans may be obtained by fractionation of a structurally heterogeneous dextran before or after isolation from the fermentate and which can be dissolved in water to give solutions of the viscosity indicated may also be used in preparing the present adhesive compositions. Dextrans which are structurally heterogeneous include those produced from the microorganisms designated as NRRL B–1142, –1192, –1255, –1351, and –1374.

Dextran hydrolyzates which meet the present requirements and obtained by hydrolyzing native dextran to segments of lower molecular weight may be used, also.

If the other requirements are met, dextran having a molecular weight between 20,000 and that of native dextran may be used.

The selection of the dextran, or of mixtures of dextrans, to be used depends on the characteristics desired for the adhesive compositions. An extremely wide choice is possible so that adhesive compositions adapted to a wide variety of uses under different sets of conditions are made available by the present invention.

Compositions suitable for marketing in the dry condition can be obtained by blending or milling the selected particulate dextran and particulate dextrin together in any suitable device to produce powders which retain their free-flowing properties at relative humidities as high as 95%. The proportion of the selected dextran component used in preparing these dry powders is from 5% to 10% by weight. These dry powders can be dissolved in water, prior to use.

Liquid adhesive compositions according to the invention and suitable for marketing as such can be prepared by mixing the dextrin with water, heating the mixture to 180–190° F. to dissolve the dextrin, adding the selected dextran at the elevated temperature, and cooking the mixture at 180–190° F. for 15–20 minutes. The dextran is completely dissolved within the 15-minute cooking period. The dextrans having properties as disclosed hereinabove are completely compatible in the dextrin formulations in concentrations of 5% to 10% by weight based on the combined weights of the dextrin and dextran, and are more compatible with the dextrin as shown by tests, than are various other substances that have been proposed as adjuvants or modifiers in dextrin adhesives, including polyvinyl alcohols.

Plasticizers may be incorporated in the compositions in an amount of about 5% by weight. Solid plasticizers which may be used include urea, thiourea, sodium nitrate, sodium thiocyanate, potassium nitrate, calcium chloride, magnesium chloride, zinc chloride, sodium lactate, sodium acetate, and sorbitol.

Suitable liquid plasticizers include glycerine, ethylene glycol, diethylene glycol, and propylene glycol.

In preparing the aqueous compositions, the plasticizer is usually added to the dextrin solution with, or at the same time as, the dextran, at the elevated temperature of 180–190° F.

The following typical formulations are given as illustrative of the new adhesive compositions—

| | Parts by weight |
|---|---|
| 1. Water | 100 |
| Dextrin | 95 |
| Dextran (NRRL native B–1146) | 5 |
| 2. Water | 100 |
| Dextrin | 90 |
| Dextran (NRRL native B–512) | 5 |
| 3. Dextrin | 95 |
| Dextran (NRRL native B–1146) | 5 |
| 4. Dextrin | 90 |
| Dextran (NRRL native B–1098) | 5 |
| Sorbitol | 5 |

An outstanding effect of the dextrans having the properties defined on the dextrin-containing adhesive compositions is the marked increase in water-resistance exhibited by the modified compositions. The water-resistance of both the dry and wet adhesive compositions is considerably better than that of the known dextrin adhesives or of adhesives based on dextran. This is surprising, since dextran is a highly hydroxylated substance which would not be expected, a priori, to impart water-resistance to the compositions.

The increase in the water-resistance of the compositions is obtained in the presence or absence of a plasticizer but is usually slightly less marked when a plasticizer is used. However, for some purposes, a plasticizer is desirable and it is found that the water-resistance of the dextrin-based compositions containing the selected dextran and a plasticizer is sufficiently up-graded and pronounced to render the plasticized products very valuable for use under conditions requiring substantial resistance to moisture.

The influence of the selected dextrans 86 to 97% of the linkages of which are 1,6 linkages on the viscosity of the dextrin adhesive formulations is shown in Table I below in which the typical NRRL native B–512 dextran was used. The formulations were prepared containing 50% total solids and the viscosities in centipoises were determined with a Brookfield viscometer using a No. 5 spindle at 20 r.p.m. The viscosities of formulations A and B should be compared with those for products C and D comprising dextrin but not containing the selected dextran component.

Table I

| Formulation, Percent Total Solids | | Centipoises at 85° F. | |
|---|---|---|---|
| | | No Plasticizer | 5% Glycerin |
| A | {Dextrin 95<br>{Dextran 5 | 9,200 | 5,300 |
| B | {Dextrin 90<br>{Dextran 10 | 10,900 | 6,600 |
| C. Dextrin | 100 | 6,180 | |
| D. Dextrin | 95 | | 4,200 |

The water-resistance of compositions according to the invention, and the influence of the selected dextrans 86 to 97% of the linkages of which are 1,6 linkages thereon, was tested by the following procedure:

The compositions containing dextrin and the typical native NRRL 1098 dextran were applied as a thin film to No. 60 coated, lithograph paper. The film was dried in the air for 24 hours. The paper was then cut into samples 4" x 2.75" to insure uniform surface area of the samples. The samples were dried in an oven at 110° C., and weighed on an analytical balance. The papers were then submerged in water at 20° C. for exactly 15 seconds, redried at 110° C. and weighed a second time to determine the amount of adhesive dissolved from the surface. The results of the tests are shown in items A and B in Table II below. These results should be compared with items C and D for papers coated with an aqueous solution of dextrin and which were prepared and tested in the same manner as papers A and B.

Table II

| Formulation, Percent of Total Solids | | Adhesive dissolved (in gms.) | |
|---|---|---|---|
| | | No Plasticizer | 5% glycerin |
| A | {Dextrin 95<br>{Dextran 5 | 0.0221 | 0.0179 |
| B | {Dextrin 90<br>{Dextran 10 | 0.0080 | 0.0114 |
| C. Dextrin | 100 | 0.0573 | |
| D. Dextrin | 95 | | 0.0215 |

The data given in Table II show that the selected dextrans which, after exhaustive research, we have found to be suitable for achieving our objectives, increase the water-resistance of the dextrin-based adhesives with and without the incorporation of a plasticizer therein.

On testing the dextran-modified adhesive compositions proved to have excellent tack, superior to that obtainable with either dextran or dextrin alone, and "quick grab." The latter term refers to the rapidity of bonding between two substrates at least one of which is coated with the adhesive composition, when the adhesive is moistened and the two substrates are pressed together.

These new compositions are remoistenable to adhesive condition. That is to say, the compositions can be applied to paper or any other suitable substrate, dried in the air or by any suitable means, and subsequently activated to adhesive condition by moistening. Thus paper, for example wallpaper, can be coated with the adhesive composition, the latter dried to a non-tacky firmly adherent film, and the paper rolled upon itself without blocking and subsequently unrolled, the dry adherent film moistened to adhesive condition, and the paper hung. Those dextrans in the group or class defined herein which may be dissolved in water under the special conditions such as NRRL B–1254 native dextran, for instance, are more especially water-resistant under ordinary conditions. Such increased water-resistance enhances the value of these dextrans as modifiers in the dextrin-based compositions to be used as remoistenable adhesives.

Dextrans, or at least some of them, have been found to have adhesive properties and adhesive compositions based on such dextrans may be used for purposes for which a high degree of water-resistance, tack and "quick-grab" are not required. However, such dextran-based adhesives do not have the viscosity range, water-resistance, tack or "grab" of the present dextrin-based compositions in which the dextran is a minor component and is essentially a modifier for the dextrin, as is shown by comparative tests. It appears that, in combination, the dextrin and selected dextran or mixture of selected dextrans, act on one another in some manner to yield the improved adhesive compositions, possibly by a complementary relation between the 1,4 linkages of the dextrin and the 1,6 linkages of the selected dextran.

The compositions of the invention are generally useful adhesives. For some industrial uses, the compositions may be modified in various respects, for instance by the inclusion of small amounts (up to 5% by weight based on the composition weight) of pigments and/or of inert fillers such as finely ground mica, ground silica (quartz) and ground glass.

Some changes and modifications may be made in the compositions as specifically discussed herein, for instance in the selection of the particular dextran component and plasticizer used. Such changes can be made without departing from the spirit and scope of the invention and therefore it will be understood that it is not intended to limit the invention except as defined in the appended claims.

What is claimed is:

1. An adhesive composition characterized by good tack and quick grab and consisting of the following constituents by weight, 100 parts water, 90 parts dextrin, and 10 parts dextran, said dextran comprising 86% to 97% of the glucosidic 1,6 linkages and having a molecular weight between 20,000 and that of native, unhydrolyzed dextran.

2. An adhesive composition comprising water, dextrin, and dextran as in claim 1, and in which is incorporated about 5% of a plasticizing agent.

3. An adhesive composition which can be applied to a substrate, dried, and subsequently activated to adhesive condition by moistening and comprising water, dextrin, about 5% of a polyhydric alcohol as a plasticizing agent, and dextran comprising 86% to 97% of the glucosidic 1,6 linkages and having a molecular weight between 20,000 and that of native, unhydrolyzed dextran, said dextran being present in an amount of 5% to 10% by weight on the total solids weight.

4. The method of preparing an aqueous adhesive composition which comprises mixing together 90 to 95 parts of dextrin with water, heating the mixture with stirring, to 180–190° F. to dissolve the dextrin, adding dextran in an amount of 5 to 10% by weight on the combined dextrin and dextran weights to the solution at said temperature, and thereafter cooking the mixture at about 180–190° F. for about 15 minutes, said dextran comprising 86% to 97% of the glucosidic 1,6 linkages and having a molecular weight between 20,000 and that of native, unhydrolyzed dextran.

5. An adhesive composition characterized by good tack, quick grab and excellent water resistance and consisting of the following constituents by weight, 100 parts water, 90–95 parts dextrin and 5–10 parts dextran, said dextran comprising 86% to 97% of the glucosidic 1,6 linkages and having a molecular weight between 20,000 and that of native unhydrolyzed dextran.

References Cited in the file of this patent

UNITED STATES PATENTS

| | | |
|---|---|---|
| 1,940,363 | McLaurin | Dec. 19, 1933 |
| 2,204,384 | Salisbury | June 11, 1940 |
| 2,215,847 | Bauer | Sept. 24, 1940 |
| 2,392,258 | Owen et al. | Jan. 1, 1946 |
| 2,736,710 | Nack | Feb. 28, 1956 |
| 2,749,277 | Toulmin | June 5, 1956 |
| 2,768,096 | Toulmin | June 5, 1956 |

FOREIGN PATENTS

| | | |
|---|---|---|
| 1,732 | Austria | July 10, 1900 |
| 149,550 | Germany | Feb. 24, 1904 |